(12) United States Patent
Wang et al.

(10) Patent No.: US 10,524,195 B2
(45) Date of Patent: Dec. 31, 2019

(54) ACCESS POINT AVAILABILITY PREDICTION

(71) Applicant: Hewlett Packard Enterprise Development LP, Houston, TX (US)

(72) Inventors: Shuai Wang, Beijing (CN); Xiaofeng Yu, Beijing (CN); Jun Qing Xie, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/579,516

(22) PCT Filed: Jun. 4, 2015

(86) PCT No.: PCT/CN2015/080790
§ 371 (c)(1),
(2) Date: Dec. 4, 2017

(87) PCT Pub. No.: WO2016/192084
PCT Pub. Date: Aug. 12, 2016

(65) Prior Publication Data
US 2018/0160364 A1 Jun. 7, 2018

(51) Int. Cl.
*H04W 48/16* (2009.01)
*H04W 24/10* (2009.01)
(Continued)

(52) U.S. Cl.
CPC .......... *H04W 48/16* (2013.01); *H04W 24/10* (2013.01); *H04W 48/20* (2013.01); *H04W 72/06* (2013.01);
(Continued)

(58) Field of Classification Search
CPC ..... H04W 48/16; H04W 48/20; H04W 24/10; H04W 72/06; H04W 72/085; H04W 36/30; H04W 24/02
See application file for complete search history.

(56) References Cited

U.S. PATENT DOCUMENTS 8,660,556 B2   2/2014  Beattie et al.
8,903,166 B2  12/2014  Yang
(Continued)

FOREIGN PATENT DOCUMENTS

CN   101730178 A   6/2010
CN   104335635 A   2/2015

OTHER PUBLICATIONS

International Searching Authority, The International Search Report and the Written Opinion, dated Mar. 7, 2016, PCT/CN2015/080790, 11 Pgs.

(Continued)

*Primary Examiner* — Marcos L Torres
(74) *Attorney, Agent, or Firm* — Manava & Kang, P.C.

(57) ABSTRACT

In an example, a set of training fingerprints may be accessed, in which each of the training fingerprints specifies an access point of a plurality of access points to which a mobile device made a successful connection, a relative signal strength of the connection to the access point, and a cellular signal strength of a cellular tower near the mobile device when the successful connection to the access point was made. Level counts of the relative signal strengths of the connections to the access points corresponding to the cellular signal strengths of the cellular tower may be cumulated from the set of training fingerprints. The cumulated level counts of the relative signal strengths of the access points may be ranked.

16 Claims, 5 Drawing Sheets

(51) Int. Cl.
H04W 48/20 (2009.01)
H04W 72/06 (2009.01)
H04W 72/08 (2009.01)
H04W 24/02 (2009.01)
H04W 36/30 (2009.01)

(52) U.S. Cl.
CPC .......... *H04W 72/085* (2013.01); *H04W 24/02* (2013.01); *H04W 36/30* (2013.01)

(56) References Cited

U.S. PATENT DOCUMENTS

| | | |
|---|---|---|
| 2007/0021126 A1 | 1/2007 | Nanda et al. |
| 2010/0172274 A1 | 7/2010 | Wu et al. |
| 2011/0286437 A1* | 11/2011 | Austin .................. H04W 4/02 370/338 |
| 2012/0102018 A1 | 4/2012 | Yang et al. |
| 2013/0040603 A1* | 2/2013 | Stahlberg .............. H04W 12/00 455/436 |
| 2014/0243004 A1* | 7/2014 | Graham et al. ....... H04W 72/08 455/452.1 |
| 2014/0222783 A1 | 8/2014 | Chang et al. |
| 2015/0024760 A1 | 1/2015 | Zheng et al. |

OTHER PUBLICATIONS

Parisi, F. et al. "Ranking and Combining Multiple Predictors Without Labeled Data", Jan. 13, 2014, 10 Pgs.
"User Privacy in iOS and OS X,", available online <http://devstreaming.apple.com/videoswwdc/2014/715xx4loqo5can9/715/715_user_privacy_in_ios_and_os_x.pdf>,109 pages.
3GPP TS 24.312, 3rd Generation Partnership Project, "Technical Specification Group Core Network and Terminals; Access Network Discovery and Selection Function (ANDSF) Management Object (MO) (Release 12)", V12.10.0, Sep. 2015, 375 pages.
Agarwal et al, "Wireless Wakeup Revisited: Energy Management for VoIP over Wi-Fi Smartphones", in MobiSys'07, 2007, pp. 179-191.
Carroll et al., "An analysis of power consumption in a smartphone," USENIXATC'10 Proceedings of the 2010 USENIX conference on USENIX annual technical conference, 2010, 14 pages.
C Chen et al., "Practical metropolitan-scale positioning for GSM phones", In Proceedings of the 8th International Conference on Ubiquitous Computing (UbiComp), vol. 4206 of Lecture Notes in Computer Science, pp. 225-242, Springer, 2006, 18 pages.
Chon et al., "Sensing WiFi Packets in the Air: Practicality and Implications in Urban Mobility Monitoring", UBICOMP '14, Sep. 13-17, 2014, 12 pages.
European Search Report and Search Opinion Received for EP Application No. 15893740.9, dated Jul. 25, 2018, 8 pages.
Feeney et al., "Investigating the energy consumption of a wireless network interface in an ad hoc networking environment," in Proc. of the Twentieth Annual Joint Conference of the IEEE Computer and Communications Societies, Anchorage, USA, Apr. 2001, 10 pages.
Ferris et al., "Gaussian processes for signal strength-based location estimation", In Robotics: Science and Systems. The MIT Press, 2006, 8 pages.
Ibrahim et al., "CellSense: An accurate energy-efficient GSM positioning system", IEEE Trans. Veh. Technol., vol. 61, No. 1, pp. 286-296, 2012, 11 pages.
Jarvelin et al., "Cumulated gain-based evaluation of IR techniques", ACM Transactions on Information Systems, vol. 20, Issue 4, 2002, pp. 422-446.
KYOCERA: "Categorizing WLAN Scanning/Discovery Assistance", R2-132021, May 20-May 24, 2013, pp. 1-4.
Li et al., "Location estimation in large indoor multi-floor buildings using hybrid networks", In Wireless Communications and Networking Conference (WCNC): Networks, 2013 IEEE, pp. 2137-2142.
Li et al., "Outdoor Location Estimation in Changeable Environments," IEEE Communications Letters, vol. 17, No. 11, Nov. 2013, pp. 2072-2075.
Oussar et al., "Indoor localization based on cellular telephony RSSI fingerprints containing very large numbers of carriers", EURASIP Journal on Wireless Communications and Networking, 2011, 2011:81, 14 pages.
Ouyang et al., "Indoor Localization via Discriminatively Regularized Least Square Classification", International Journal of Wireless Information Networks, vol. 18, Jun. 2011, Issue 2, pp. 57-72.
Quinlan, J. R., "C4.5: Programs for Machine Learning", Morgan Kaufmann Publishers, 1993, book review available online at <https://link.springer.com/content/pdf/10.1007%2FBF00993309.pdf>, 6 pages.
Schwaighofer et al., "GPPS: A Gaussian process positioning system for cellular networks", In Advances in Neural Information Processing Systems 16. MIT Press, 2003, 8 pages.
Thrun et al., "Robust Monte Carlo localization for Mobile Robots", Articial Intelligence, vol. 128, 2001, pp. 99-141.
Tian et al., "Practical Indoor Localization using Ambient RF", IEEE International Instrumentation and Measurement Technology Conference (I2MTC), May 2013, United States. pp. 1125-1129.
Tsoumakas et al., "Mining Multi-label Data", Data Mining and Knowledge Discovery Handbook, O. Maimon, L. Rokach (Ed.), Springer, 2nd edition, 2010, 20 pages.
Tsoumakas et al., "Multi-label classification: an overview," International Journal of Data Warehousing & Mining, vol. 3, No. 3, 2009, pp. 1-13.
Tsoumakas et al., "Random k-labelsets: An ensemble method for multilabel classification", In: Proceedings of the 18th European Conference on Machine Learning (ECML-2007), Warsaw, Poland, 2007, pp. 406-417.

* cited by examiner

ACCESS POINT AVAILABILITY PREDICTION

BACKGROUND

Cellular network communications devices, such as cellular telephones and cellular network access points, transmit data across cellular networks. As bandwidth for transmitting data across cellular networks is often limited, some cellular network communications devices transfer data across other networks, such as broadband or satellite networks.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Cellular network communications devices, or cellular devices, may use mobile data offloading (MDO) techniques to avoid using cellular networks to transmit data. For example, a mobile device such as a cellular telephone, a tablet computer, a personal computer, etc., may connect to a broadband network using an included Wi-Fi radio in communication with a Wi-Fi access point, offloading the transmission of data from a cellular network to the broadband network. Offloading the transmission of data to a non-cellular network may increase available cellular network bandwidth and, in some situations, increase the speed and/or reliability of data transmission for individual communications devices. For users who have network provider enforced limits on cellular data transmission, data offloading may allow those users' devices to transmit data across networks that do not contribute to the users' cellular data limit.

For some MDO techniques, mobile devices use Wi-Fi radios to scan for and connect to available Wi-Fi access points that are connected to non-cellular networks. However, using a Wi-Fi radio requires power, and frequent use of a Wi-Fi radio to search for access points may drain a device's battery, and connecting or attempting to connect to an access point with relatively low signal strength may result in relatively slow data transmission and/or data loss, leading to a poor user experience. Predicting wireless access point availability allows a cellular network communications device to predict when a Wi-Fi access point may be within range of the device and, in some instances, predict the quality, e.g., signal strength, of the access point. This allows the mobile device to leave its Wi-Fi radio off until an access point with a certain predicted signal strength is predicted to be within range, preserving the device's battery and increasing the likelihood of performing a successful handoff. The mobile device may also leave its global positioning system (GPS) device turned off during identification of the predicted available access point.

As used herein, the term "access point" may refer to any device that allows wireless devices to connect to a network that is separate from the cellular network on which a cellular device is operating. For example, the access point may be a device connected to a Wi-Fi router or the Wi-Fi router itself, in which the Wi-Fi router is connected to a broadband or satellite network, or—in some implementations—a cellular hotspot connected to a cellular network that is separate from the cellular network on which the cellular device is operating. Cellular devices may communicate with access points in a variety of ways, including Wi-Fi, Wi-Fi Direct, and Bluetooth™, to name a few.

To predict wireless access point availability, a mobile device may gather fingerprints for successful handoffs, e.g., successful connections to Wi-Fi access points. Fingerprints may include data specifying cellular signal strengths, e.g., measured in decibel-milliwatts (dBm), for nearby cellular towers, or cells. For example, a mobile device may generate a fingerprint, also recited as a wireless fingerprint herein, at the time the mobile device connects to a Wi-Fi access point, and the fingerprint may specify the identifiers and cellular signal strengths of nearby cellular towers at the time of the connection. Each of the fingerprints may also specify an access point of a plurality of access points to which the mobile device made a successful connection and a relative signal strength of the connection to the access point.

As disclosed herein, level counts of the relative signal strengths of the connections to the access points may be cumulated from the set of training fingerprints corresponding to the cellular signal strengths of the cellular tower(s) that are nearby the mobile device when the successful connections were made to the access points. In addition, the cumulated level counts of the relative signal strengths of the access points may be ranked according to a predetermined scheme and an index correlating the ranked access points to the cellular tower identifiers and cellular signal strength pairs identified to be near the mobile device(s) when the mobile device(s) made successful connections to the access points may be stored. A cellular tower may be considered to be near a mobile device if the mobile device is able to communicate data to the cellular tower with a sufficient power to enable the cellular tower to transmit its cellular tower identifier to the mobile device.

As disclosed herein, the index may be queried to identify an access point that is predicted to be available to a mobile device. Particularly, a mobile device may determine the cellular tower identifier and cellular signal strength of a nearby cellular tower and may generate a query fingerprint specifying the cellular tower identifier and cellular signal strength of the nearby cellular tower. In addition, a query may be performed on the index using the query tower identifier and the query cellular signal strength as keywords of the query. Performance of the query may result in the identification of a matching cellular tower identifier and cellular signal strength pair in the index. Additionally, an access point corresponding to the matching cellular tower identifier and cellular signal strength in the index may be identified as an access point that is predicted to be available for the mobile device. The identified access point may also be predicted to have relatively high signal strength. In one regard, an access point predicted to be available may be identified for the mobile device without requiring that the Wi-Fi radio or the GPS device of the mobile device be activated, which may result in a minimization of the power consumed by the mobile device in attempting to connect to an available access point.

Figure 1A:
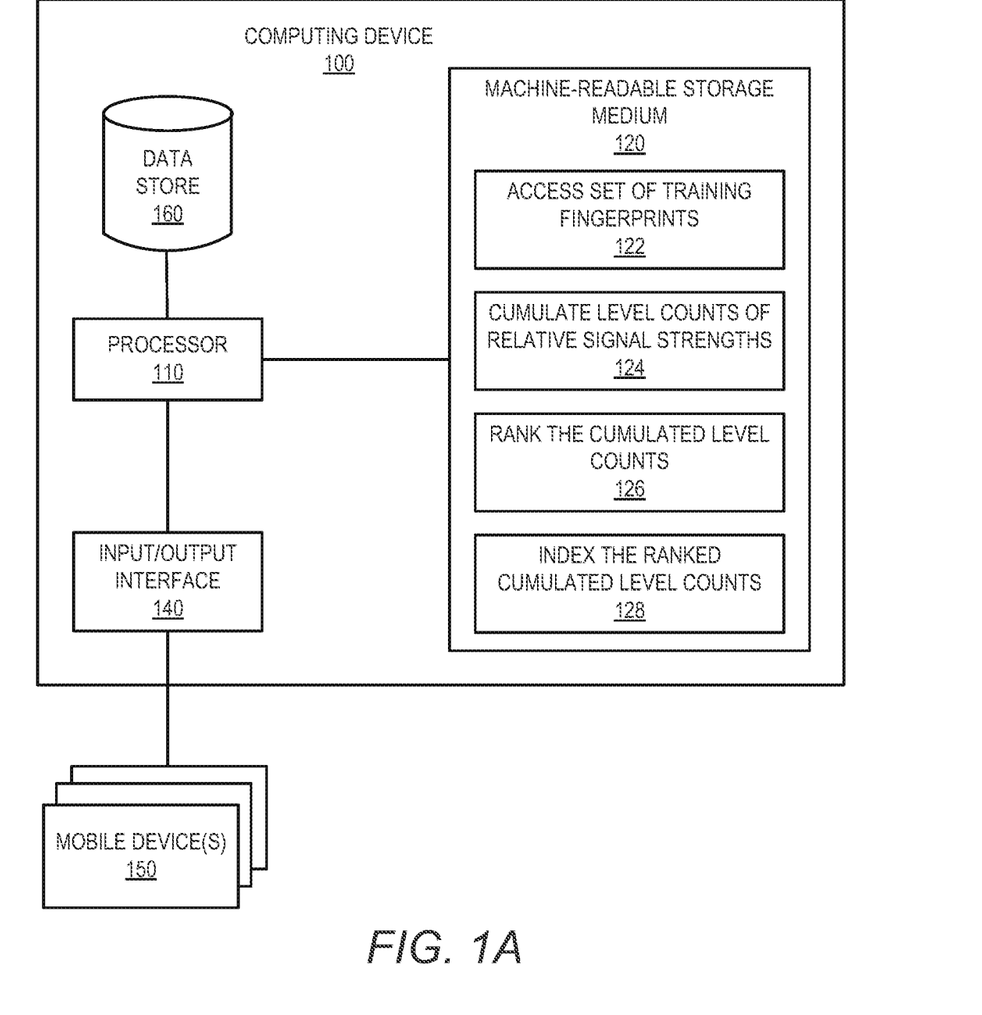
FIGS. 1A and 1B, respectively, show block diagrams of a computing device to predict access point availability, according to two examples of the present disclosure.
Figure 1B:
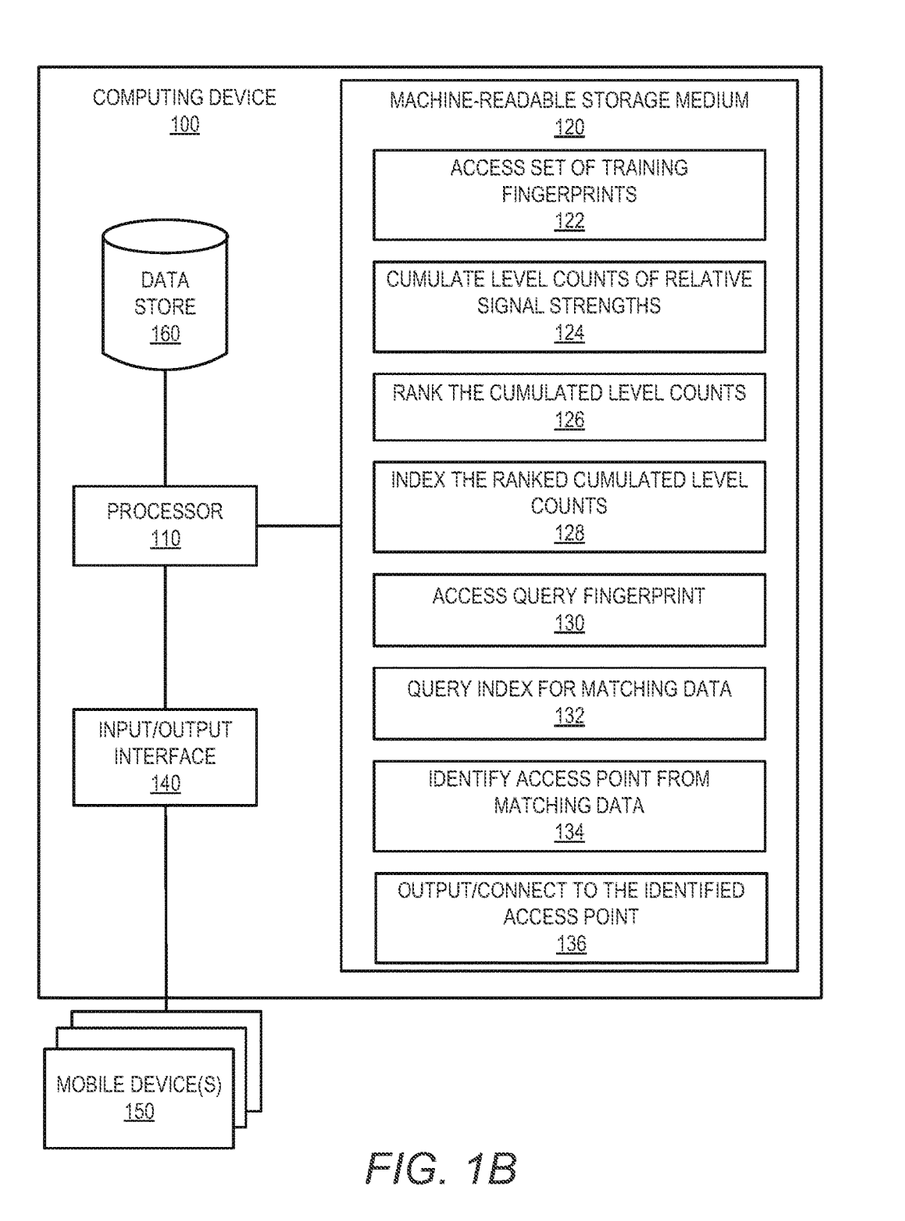

With reference to FIGS. 1A and 1B, there are respectively shown block diagrams of a computing device 100 to predict access point availability, according to two examples. It should be understood that the computing device 100 depicted in FIGS. 1A and 1B may include additional components and that some of the components described herein may be removed and/or modified without departing from a scope of the computing device 100.

The computing device 100 may be, for example, a cellular telephone, a smartphone, a personal computer, a server computer, or any other similar electronic device that is able to perform cellular communications or communicate with mobile devices. The computing device 100 is depicted as including a processor 110 and a machine-readable storage medium 120. The processor 110 may be one or more central processing units (CPUs), semiconductor-based microprocessors, an application specific integrated circuit (ASIC), and/or other hardware devices suitable for retrieval and execution of instructions stored in the machine-readable storage medium 120. The processor 110 may fetch, decode, and execute instructions, such as instructions 122-128 stored on the machine-readable storage medium 120, to control processes to access a set of training fingerprints 122, cumulate level counts of the relative strengths of connections to access points 124, rank the cumulated level counts 126, and index the ranked cumulated level counts 128. As an alternative or in addition to retrieving and executing instructions, the processor 110 may include one or more electronic circuits that include electronic components for performing the functionalities of the instructions 122-128.

The machine-readable storage medium 120 may be any electronic, magnetic, optical, or other physical storage device that contains or stores executable instructions. Thus, the machine-readable storage medium 120 may be, for example, Random Access Memory (RAM), an Electrically Erasable Programmable Read-Only Memory (EEPROM), a storage device, an optical disc, and the like. In some implementations, the machine-readable storage medium 120 may be a non-transitory storage medium, where the term "non-transitory" does not encompass transitory propagating signals. As described in detail below, machine-readable storage medium 120 may be encoded with a series of executable instructions 122-128 to cumulate level counts of relative signal strengths of connections to access points and to predict access point availability.

As also shown in FIGS. 1A and 1B, the computing device 100 may also include an input/output interface 140 through which the processor 110 may communicate with mobile device(s) 150. The input/output interface 140 may include hardware and/or software to enable the processor 110 to communicate with the mobile device(s) 150. The input/output interface 140 may enable a wireless connection to the mobile device(s) 150, for instance through a peer-to-peer connection such as Wi-Fi, Bluetooth™, etc. The input/output interface 140 may also enable a wired connection to the mobile device(s) 150 directly and/or through a network. The input/output interface 140 may further include a network interface card and/or may also include hardware and/or software to enable the processor 110 to communicate with various input and/or output devices, such as a keyboard, a mouse, a display, another computing device, etc., through which a user may input instructions into the computing device 100.

Each of the mobile devices 150 may be a cellular communications device, a cellular telephone, a smartphone, a tablet computer, a personal computer, server computer, or another device that is to send and receive data across cellular and Wi-Fi networks. According to an example, the mobile device(s) 150 may collect training fingerprints for each successful connection to a wireless access point. Each of the training fingerprints may specify an access point to which the mobile device 150 successfully connected and a cellular signal strength for each cellular tower in a set of cellular towers that are near the mobile device 150 when the successful connection to the access point was made. For example, a mobile device 150, such as a cellular telephone may, in response to successfully connecting to an access point, create and provide to the computing device 100 training fingerprints that include signal strength measurements for each of the cellular towers within range of the cellular telephone at the time the cellular telephone connected to the access point. That is, for instance, each training fingerprint may specify a cellular tower or towers that were near the mobile device 150 when the mobile device 150 successfully connected to the access point. In a particular example, a training fingerprint may specify a cellular tower or towers to which the mobile device 150 was in communication with prior to or during the successful connection to the access point.

In some examples, each training fingerprint further specifies, for the corresponding mobile device 150, an access point signal strength for the access point to which the mobile device 150 successfully connected. For example, in addition to specifying the signal strengths of each nearby cellular tower, a fingerprint may also specify the relative signal strength of the access point to which the mobile device 150 connected.

Thus, for instance, each training fingerprint may include information as shown in Table 1 below.

TABLE 1

| Training Data Set | Cell-IDs & RSSI of Fingerprint | | AP & RSS Level of Fingerprint | | |
|---|---|---|---|---|---|
| Fingerprints | Cell-ID | RSSI | APa | APb | APc |
| F1 | CellA | −53 | 3 | 2 | — |
| F2 | CellA | −53 | 4 | 2 | — |
| F3 | CellA | −53 | 4 | 2 | 2 |
| F4 | CellA | −51 | 4 | 3 | — |
| F5 | CellA | −51 | 3 | 2 | 2 |
| F6 | CellA | −51 | 4 | 3 | 4 |
| ... | ... | ... | ... | ... | ... |

Table 1 depicts a number of sample fingerprints in a set of training fingerprints by way of example. It should therefore be clearly understood that the data depicted in Table 1 are for illustrative purposes only and should thus not be construed as limiting the computing device 100 or any other component disclosed herein.

As shown in Table 1, each training fingerprint (F1 . . . Fn) may identify a cellular tower identifier (Cell-ID) and a received signal strength indicator (RSSI), which is also referred to herein as a cellular signal strength of communications with a cellular tower. A mobile device 150 may receive the cellular tower identifier from a cellular tower near the mobile device 150. Additionally, the mobile device 150 may determine the cellular signal strength, for instance in decibel-milliwatts (dBm), of data communications with the cellular tower through a detection of the power level of the communications with the cellular tower. Although a single cellular tower (CellA) is depicted in Table 1, the training data set of fingerprints may include additional cellular towers (CellB-Celln), for instance, depending upon the cellular towers to which the mobile device(s) 150 connected.

Each of the training fingerprints (F1 . . . Fm) may also specify access point identifiers (APa-APc) and relative signal strengths (RSS's) of connections between a mobile device 150 and the access points corresponding to the access point identifiers. The mobile device 150 may receive the access point identifiers (APa-APc) from the respective access points and may detect the power levels of the connections, for instance in decibel-milliwatts (dBm), to the access points to determine the relative signal strengths. According to a particular example, the relative signal strengths of the connections to the access points may be normalized or scaled, for instance, to have integer values between zero and 4.

As shown in Table 1, by way of example, a training fingerprint (F1) may specify that a cellular tower having the cellular tower identifier CellA was near a mobile device 150 and that the cellular signal strength of the connection was −53 dBm. The training fingerprint (F1) may also specify that a connection was made to a first access point having the access point identifier APa and the relative signal strength of that connection had a normalized value of 3 and that another connection was made to a second access point having the access point identifier APb and the relative signal strength of that connection had a normalized value of 2. The training fingerprint (F1) may further specify that no connection or a sufficiently low power connection to warrant a normalized value of zero was made with a third access point having the access point identifier APc.

As discussed herein, the relative signal strengths of the connections to the access point(s) may correspond to the cellular tower identifier and cellular signal strength to which the mobile device 150 communicated prior to being connected to the access point(s). In addition, or alternatively, the relative signal strengths of the connections to the access point(s) may correspond to the cellular tower identifier and cellular signal strength of a nearby cellular tower at the time at which the connection to the access point(s) is made.

According to an example, the mobile device(s) 150 may collect the fingerprints and may communicate the collected fingerprints to the computing device 100. In this example, the processor 110 may store the fingerprints received from a single mobile device 150, which enables data to be generated for each mobile device 150. In another example, the processor 110 may store the fingerprints received from multiple mobile devices 150, which may facilitate generation of crowd-sourced access point availability prediction data. In any regard, the processor 110 may implement the instructions to access the set of training fingerprints 122, in which the set of training fingerprints 122 are from one or multiple ones of the mobile devices 150.

In another example, the computing device 100 is a mobile device 150 and may thus collect the fingerprints shown in Table 1 and may store the fingerprints locally on the computing device 100. In this example, the processor 110 may implement the instructions to access the set of training fingerprints 122 that have been collected and stored by the computing device 100. Additionally, in this example, the computing device 100 may not be in communication or receive training fingerprints from other mobile devices 150.

In either or both of these examples, the processor 110 may implement the instructions to cumulate level counts of the relative signal strengths 124 of the connections to the access points based on the information contained in the set of training fingerprints. That is, for each of the cellular tower identifier and cellular signal strength pairs specified in the set of training fingerprints, the processor 110 may cumulate level counts of the normalized relative signal strengths of the connections to the access points corresponding to the cellular tower identifier and cellular signal strength pairs. In other words, the processor 110 may determine, for each cellular tower identifier and cellular signal strength pair, the relative signal strengths of each of a plurality of access points and the number of times the respective relative signal strengths are identified in the set of training fingerprints. In addition, the training fingerprints may be merged based on the cellular tower and cellular signal strengths corresponding to connections between the mobile device and the cellular tower prior to the mobile device making a successful connection to the access points.

An example of the cumulated level counts of the relative signal strengths of the connections to the access points is provided below in Table 2.

TABLE 2

| Cell-ID & RSSI Index | APa's Level(Count) | APb's Level(Count) | APc's Level(Count) |
|---|---|---|---|
| CellA, −53 | 4(2), 3(1) | 2(3) | 2(1) |
| CellA, −51 | 4(2), 3(1) | 3(2), 2(1) | 4(1), 2(1) |
| . . . | . . . | . . . | . . . |

Table 2 depicts a number of sample level counts corresponding to the fingerprints depicted in Table 1. In this regard, for each of the cellular tower identifier (Cell-ID) and cellular signal strength (RSSI) pairs, the levels and the counts of each of the relative signal strengths (RSS's) of the access points (APa-APc) are specified. Thus, for a connection to a first cellular tower (CellA) having a cellular signal strength of −53 dBm, the set of training fingerprints shown in Table 1 indicates that there were two connections to a first access point (APa) having a normalized relative signal strength of four and one connection to the first access point (APa) having a normalized relative signal strength of 1. In addition, the set of training fingerprints shown in Table 1 indicates that there were three connections to a second access point (APb) having a normalized relative signal strength of two and that there was one connection to a third access point (APc) having a normalized relative signal strength of two.

The processor 110 may also implement the instructions to rank the cumulated level counts 126 to rank or sort, for each of the cellular tower identifier (Cell-ID) and cellular signal strength (RSSI) pairs, the access points (APa-APc) according to the cumulated level counts of the relative signal strengths of the connections to the access points. The processor 110 may rank or sort the access points according to a predetermined ranking or sorting scheme. For instance, the processor 110 may rank the access points in a descending order according to the level counts of the access points corresponding to each of the cellular tower identifier (Cell-ID) and cellular signal strength (RSSI) pairs. An example of the ranked access points corresponding to the cellular tower identifier (Cell-ID) and cellular signal strength (RSSI) pairs depicted in Table 2 is depicted in Table 3.

TABLE 3

| Cell-ID & RSSI Index | Prioritized AP List |
| --- | --- |
| CellA, −53 | APa > APb > APc |
| CellA, −51 | APa > APc > APb |
| . . . | . . . |

Table 3 depicts a correlation between the cellular tower identifier (Cell-ID) and cellular signal strength (RSSI) pairs and a list of the access points arranged in a prioritized list. Thus, for instance, for a cellular tower having a cellular tower identifier (CellA) and a cellular signal strength of −53, a first access point (APa) may have priority over other access points (APb and APc). The prioritized AP list may thus specify the predicted order of availability of the access points, for instance, based upon their predicted signal strengths. In this regard, a mobile device 150 may attempt to connect to the access points in the predicted order.

The processor 110 may also implement the instructions to index the ranked level counts 128 to generate an index of the cellular tower identifier (Cell-ID) and cellular signal strength (RSSI) pairs and the corresponding ranked list of access points. In other words, the processor 110 may generate the index to enable identification of an access point that is predicted to provide a highest level of connection to a mobile device 150 based upon a specified cellular tower identifier (Cell-ID) and cellular signal strength (RSSI) pair. Additionally, the processor 110 may generate the index such that the cellular tower identifier (Cell-ID) and cellular signal strength (RSSI) pairs are also arranged in a sorted order, for instance, based upon the cellular tower identifiers (Cell-ID) and cellular signal strengths (RSSI). By way of particular example, the cellular tower identifier (Cell-ID) and cellular signal strength (RSSI) pairs may be arranged in descending order according to the cellular tower identifiers (Cell-ID's) and then the cellular signal strengths (RSSI's).

The processor 110 may store the generated index in a data store 160 of the computing device 100. According to an example, the index of the ranked cumulated level counts may be accessed, e.g., queried, searched, etc., to predict access point availability for a mobile device 150 as described in greater detail herein.

Turning now to FIG. 1B, additional instructions 130-136 are depicted as being stored in the machine-readable storage medium 120. The additional instructions 130-136 may pertain to the use of the index of the ranked cumulated level counts to predict availability of an access point. More particularly, for instance, the index of the ranked cumulated level counts may enable the prediction of available access points through a relatively simple keyword query into the index. That is, the access point having the highest ranking corresponding to a cellular tower identifier and cellular signal strength pair may be identified through a query of the index using a query cellular tower identifier and query cellular signal strength.

The processor 110 may implement the instructions to access a query fingerprint 130 from a mobile device 150. The query fingerprint may include a query cellular tower identifier and a corresponding query cellular signal strength. By way of example, the query cellular tower identifier may be the identifier of the cellular tower with which the mobile device 150 is currently communicating data and the query cellular signal strength may correspond to the strength of the cellular signal between the mobile device 150 and the cellular tower. Thus, for instance, the mobile device 150 may receive the cellular tower identifier from the cellular tower with which the mobile device 150 is communicating and may determine the cellular signal strength through a measurement of the strength of the cellular signal. In addition, a mobile device 150 may communicate the query fingerprint containing the query cellular tower identifier and the query cellular signal strength to the computing device 100.

The processor 110 may implement the instructions to query the index of the ranked cumulated level counts 132 for a cellular tower identifier and cellular signal strength pair that match the query cellular tower identifier and query cellular signal strength contained in the query fingerprint. That is, the processor 110 may query the index to determine which of the entries in the index contains a match to the query fingerprint. Particularly, the processor 110 may determine which of the cellular tower identifier (Cell-ID) and cellular signal strength (RSSI) pairs identified in the index match the query cellular tower identifier and the query cellular signal strength contained in the query fingerprint.

The processor 110 may also implement the instructions to identify an access point 134 that is predicted to be available to the mobile device 150 from the entry in the index determined to contain the matching cellular tower identifier and cellular signal strength pair. That is, for instance, the processor 110 may determine which of a plurality of access points (APa-APc) is identified as having the highest ranking in the index for the matching cellular tower identifier and cellular signal strength pair. By way of example in which the cellular tower identifier is CellA and the cellular signal strength is −53, with respect to Table 3, the index identifies the first access point (APa) as having the highest ranking.

The processor 110 may further implement the instructions to output the identified access point 136 to output the identified access point to the mobile device 150. In another example, the processor 110 may output the ranked list of access points corresponding to the identified cellular tower identifier and cellular signal strength pair such that, for instance, if the mobile device 150 is unable to connect to the highest ranked access point, the mobile device 150 may attempt to connect to the next highest ranked access point, etc.

According to another example, the mobile device 150 may concurrently communicate with multiple cellular towers. In this example, the query fingerprint may include multiple query cellular tower identifiers and their corresponding query cellular signal strengths. In addition, the processor 110 may implement the instructions to query the index for matching data 132 to query the index for each of the multiple query cellular tower identifiers. The processor 110 may identify the cellular tower identifier and cellular signal strength pair having the highest ranking in the index that matches one of the multiple query cellular tower identifier and query cellular signal strength pairs in the query fingerprint. Furthermore, the processor 110 may identify the access point corresponding to the matching cellular tower identifier and cellular signal strength pair.

According to a further example, the computing device 100 is a mobile device 150. In this example, the computing device 100 may identify the cellular tower identifier and the cellular signal strength of the cellular tower identifier to which the computing device 100 is in communication. The processor 110 of the computing device 100 may also generate the query fingerprint with this data and may implement the instructions 130-134 to identify an access point that is predicted to be available to the computing device 100. In addition, the processor 110 may implement the instructions to connect to the identified access point 136 to attempt to connect to the identified access point.

Through implementation of the computing device 100 disclosed herein, a mobile device 150 (or the computing device 100) may predict the availability of an access point without first attempting to connect to the access point. As such, the mobile device 150 (or the computing device 100) may leave its Wi-Fi radio off until an access point with a certain predicted signal strength is predicted to be within range of the mobile device 150 (or the computing device 100). The mobile device 150 (or the computing device 100) may also predict the availability leave its GPS device off With reference now to FIG. 2, there is shown a schematic diagram of a network 200 on which various features of a method for predicting access point availability disclosed herein may be implemented, according to an example. It should be understood that the network 200 depicted in FIG. 2 may include additional components and that some of the components described herein may be removed and/or modified without departing from the scope of the network 200. For instance, the network 200 may include a plurality of cellular towers to which mobile devices may be in communication as well as a larger number of access points that is shown in FIG. 2.

Figure 2:
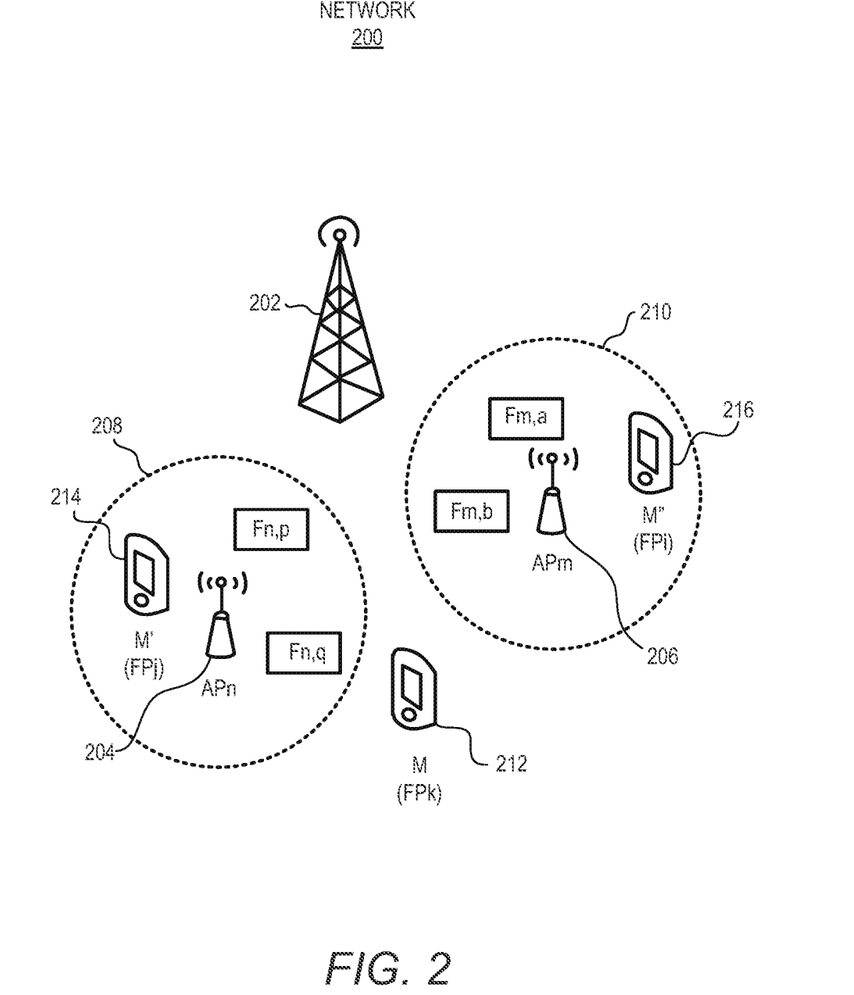
FIG. 2 shows a schematic diagram of a network on which various features of a method for predicting access point availability may be implemented, according to an example of the present disclosure.

As shown in FIG. 2, the network 200 may include a cellular tower 202, a first access point (APn) 204, and a second access point (APm) 206. The cellular tower 202 may provide cellular network coverage to cellular devices, such as mobile devices 212-216. Particularly, the mobile device 212 may communicate data over a cellular network through the cellular tower 202 and the mobile devices 214 and 216 may communicate data over a network other than the cellular network through the access points 204, 206, respectively. For instance, the first access point (APn) 204 and the second access point (APm) 206 may provide the mobile devices 212-216 with access to the Internet through a network other than a cellular network, such as a broadband network, a satellite network, or the like. The first access point 204 may have a first Wi-Fi range 208 and the second access point 206 may have a second Wi-Fi range 210, as denoted by the dashed circles. Although the first and second Wi-Fi ranges 208, 210 have been depicted as being separated from each other, portions of the first and second Wi-Fi ranges 208, 210 may alternatively overlap each other, for instance, depending upon the positions of the first access point 204 and the second access point 206.

A first mobile device M 212 is depicted as being outside of both Wi-Fi ranges 208, 210, a second mobile device M' 214 is depicted as being positioned within the first Wi-Fi range 208, and a third mobile device M" 216 is depicted as being positioned within the second Wi-Fi range 210. In addition, the first mobile device M 212 is depicted as having a current cellular fingerprint $FP_k$, the second mobile device M' 214 is depicted as having a cellular fingerprint $FP_j$, and the third mobile device M" 216 is depicted as having a cellular fingerprint $FP_i$. FIG. 2 also shows a number of historic fingerprints $F_{n,p}$, $F_{n,q}$, $F_{m,a}$, $F_{m,b}$ that represent locations and fingerprints that were previously collected by mobile devices, which may be the mobile devices 212-216 and/or other mobile devices. In any regard, the historic fingerprints may be contained in the set of training fingerprints to generate the index for use in predicting access point availability described herein.

According to an example, prior to connecting and/or during connection to an access point 204 or 206, each of the mobile devices 212-216 may be in communication with the cellular tower 202. The mobile devices 212-216 may receive the cellular tower identifier of the cellular tower 202 and may determine the cellular signal strength of the connection to the cellular tower 202. The mobile devices 212-216 may also generate a query fingerprint containing the cellular tower identifier and the cellular signal strength. As described above, the query fingerprint may be used either by the mobile devices 212-216 or another computing device 100 (FIGS. 1A and 1B) to query an index of ranked cumulated level counts of access points to determine which, if any, of a plurality of access points the mobile devices 212-216 are predicted to be available to the mobile devices 212-216.

Due to the different locations of the mobile devices 212-216, for instance, the cellular signal strengths of the connections between the mobile devices 212-216 and the cellular tower 202 may differ for each of the mobile devices 212-216. In this regard, the query fingerprints $FP_k$, $FP_j$, and $FP_i$ generated by each of the mobile devices 212-216 may differ amongst each other. In this regard, the query fingerprint $FP_k$ for the first mobile device 212 may result in an identification of neither of the access points 204 and 206 being predicted to be available to the first mobile device 212. As another example, the query fingerprint $FP_j$ for the second mobile device 214 may result in an identification of the first access point 204 being predicted to be available to the second mobile device 214. As a further example, the query fingerprint $FP_i$ for the third mobile device 216 may result in an identification of the second access point 206 being predicted to be available to the third mobile device 216. In further examples, the query fingerprint $FP_i$ for the third mobile device 216 may result in an identification of both the first access point 204 and the second access point 206 being predicted to be available to the third mobile device 216. In these examples, the rankings of the first access point 204 and the second access point 206 contained in the index may be identified such that, for instance, if the second access point 206 has a higher ranking, the third mobile device 216 may attempt to connect to the second access point 206 prior to attempting to connect to the first access point 204.

As described above, identification of the access points predicted to be available to the mobile devices 212-216 may be made through a keyword search of the index. Particularly, a query cellular tower identifier and query cellular signal strength pair contained in a query fingerprint may be matched with a cellular tower identifier and cellular signal strength pair contained in the index. In addition, the rankings of the access points corresponding to the matching cellular tower identifier and cellular signal strength pair in the index may be identified and outputted to the mobile devices 212-216. In other instances in which the mobile devices 212-216 perform the query, the mobile devices 212-216 may make this identification and may attempt to connect to the access point identified as having the highest ranking for the matching cellular tower identifier and cellular signal strength pair in the index.

Through implementation of the features disclosed herein, the availabilities of the access points 204, 206 for the mobile devices 212-216 may predicted while their GPS and WiFi adapters are turned off. The mobile devices 212-216 may thus identify access point(s) 204, 206 that have been predicted to be available to the mobile devices 212-216 while conserving or minimizing power consumption in predicting available access point(s) 204, 206 to which the mobile devices 212-216 may connect.

Figure 3:
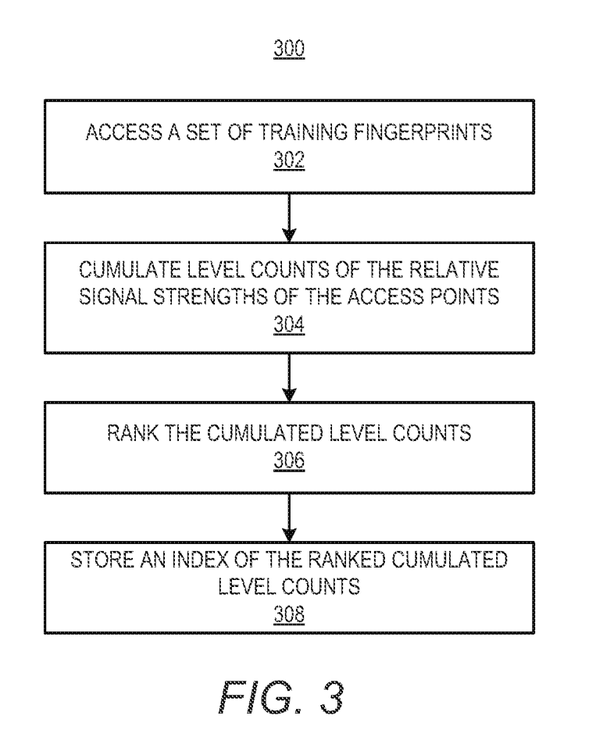
FIGS. 3 and 4, respectively, show flow diagrams of methods for predicting access point availability, according to two examples of the present disclosure.
Figure 4:
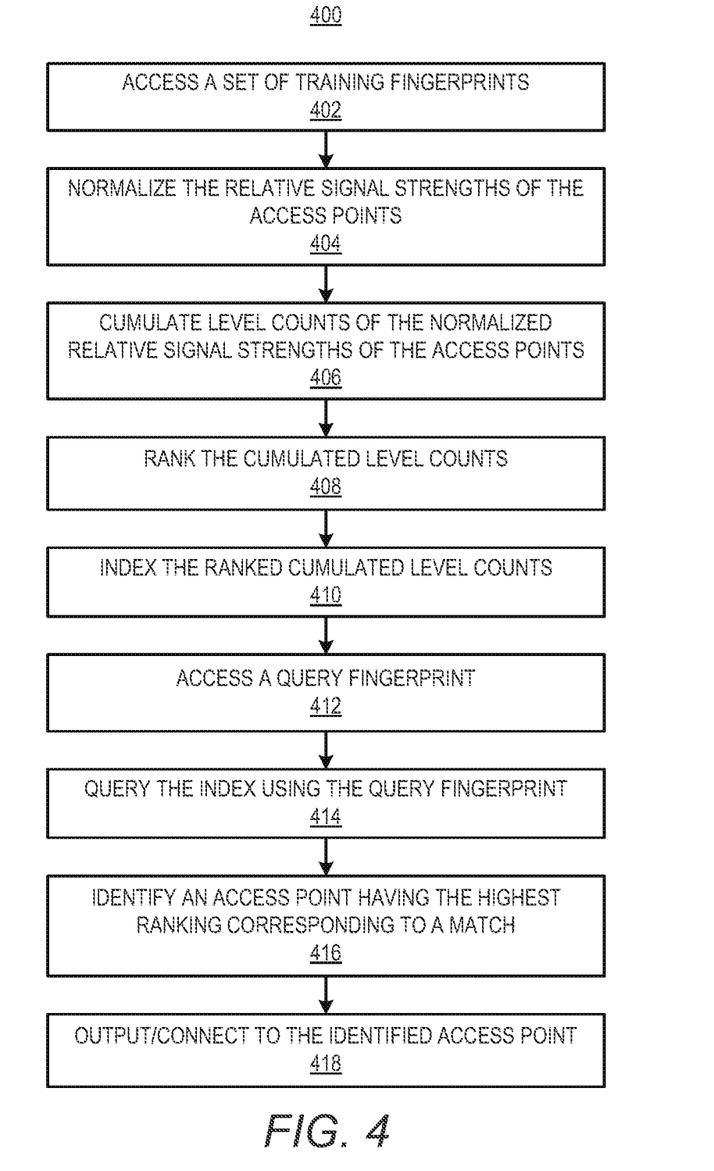

With reference now to FIGS. 3 and 4, there are respectively shown flow diagrams of methods 300 and 400 for predicting access point availability, according to two examples. It should be understood that the methods 300 and 400 depicted in FIGS. 3 and 4 may include additional operations and that some of the operations described herein may be removed and/or modified without departing from the scopes of the methods 300 and 400. The descriptions of the methods 300 and 400 are made with reference to the features depicted in FIGS. 1A, 1B, and 2 for purposes of illustration and thus, it should be understood that the methods 300 and 400 may be implemented in apparatuses having architectures different from those shown in those figures.

In one example, a processor 110 of a computing device 110 that is to receive collected training fingerprints from a mobile device 150 or mobile devices 150 may implement the methods 300 and 400. In another example, a processor 110 of a computing device 100, in which the computing device 100 is a mobile device 150, may implement the methods 300 and 400. In this example, the computing device 100 may collect the training fingerprints.

With reference first to FIG. 3, at block 302, a processor 110 may access a set of training fingerprints. The training fingerprints may have previously been collected and stored in a data store 160 and the processor 110 may access the set of training fingerprints from the data store 160. Each of the training fingerprints may specify an access point 204 of a plurality of access points 204, 206 to which a mobile device 150 successfully connected over a period of time, for instance, over a day, a week, etc. Each of the training fingerprints may also specify a relative signal strength of the connection to the access point 204, and a cellular signal strength, e.g., received signal strength indicator (RSSI), of a cellular tower 202 to which the mobile device 150 was connected prior to the mobile device 150 being handed off from the cellular tower 202 to the access point 204. In other words, each of the training fingerprints may specify a cellular signal strength of a connection between the mobile device 150 and the cellular tower 202 immediately prior to or during establishment of the connection between the mobile device 150 and the access point 204 being established. An example of the training set of fingerprints is shown and described above with respect to Table 1.

At block 304, the processor 110 may cumulate, from the set of training fingerprints, level counts of the relative signal strengths of the access points 204, 206 corresponding to the cellular signal strengths of the cellular tower 202. For instance, as shown in Table 2 above, the processor 110 may determine, for each cellular tower identifier and cellular signal strength pair, the relative signal strengths of each of the access points 204, 206 and the count of the number of times the respective relative signal strengths are identified in the training set of fingerprints. The level counts of the relative signal strengths may therefore identify the number of times each respective relative signal strength (level) was collected for a particular cellular tower identifier and cellular signal strength pair.

At block 306, the processor 110 may rank the cumulated level counts of the relative signal strengths of the access points 204, 206 according to a predetermined ranking or sorting scheme. For instance, the processor 110 may rank or sort, for each of cellular tower identifier and cellular signal strength (RSSI) pair, the access points 204, 206 according to the cumulated level counts of the relative signal strengths of the access points 204, 206. According to an example, the predetermined ranking scheme may involve ranking the access points 204, 206 having larger level counts higher than access points having lower level counts. An example of access points ranked in descending order for each cellular tower identifier and cellular signal strength pair is shown and described above with respect to Table 3.

At block 308, the processor 110 may store an index of the ranked cumulated level counts according to identifications and cellular signal strengths of the cellular tower. The index may enable an availability of an access point of the plurality of access points to be predicted through a search for a cellular tower identification and cellular signal strength in the index. For instance, the processor 110 may store the index in a manner as shown in Table 3 above such that a cellular tower identification and cellular signal strength pair may be correlated with a ranked list of available access points. In one regard, therefore, the processor 110 may identify the highest ranked access point corresponding to a cellular tower identification and cellular signal strength pair by performing a query on the index for the cellular tower identification and cellular signal strength pair. In other words, for a given cellular tower identification and cellular signal strength pair, the processor 110 may identify the corresponding access point predicted to be available by simply performing a keyword search into the index.

Turning now to FIG. 4, at block 402, the processor 110 may access a set of training fingerprints as described above with respect to block 302 in FIG. 3. At block 404, the relative signal strengths of the access points 204, 206 may be normalized. That is, for instance, the relative signal strengths of the access points 204, 206 may be normalized or scaled to have one of a predetermined integer values. By way of example, relative signal strengths of between about −1 to about −5 dBm may be normalized to a value of 1, relative signal strengths of between about −6 to about −10 dBm may be normalized to a value of 2, etc. Examples of normalized access point relative signal strengths are provided in Table 2 above.

At block 406, the processor 110 may cumulate, from the set of training fingerprints, level counts of the normalized relative signal strengths of the access points 204, 206 corresponding to the cellular signal strengths of the cellular tower 202. For instance, as shown in Table 2 above, the processor 110 may determine, for each cellular tower identifier and cellular signal strength pair, the normalized relative signal strengths of each of the access points 204, 206 and the count of the number of times the respective normalized relative signal strengths are identified in the training set of fingerprints. The level counts of the normalized relative signal strengths may therefore identify the number of times each respective relative signal strength (level) was collected for a particular cellular tower identifier and cellular signal strength pair.

At block 408, the processor 110 may rank the cumulated level counts of the normalized relative signal strengths of the access points 204, 206 according to a predetermined ranking scheme. For instance, the processor 110 may rank or sort, for each of cellular tower identifier and cellular signal strength (RSSI) pair, the access points 204, 206 according to the cumulated level counts of the normalized relative signal strengths of the access points 204, 206. According to an example, the predetermined ranking scheme may involve ranking the access points 204, 206 having larger level counts higher than access points having lower level counts. An example of access points ranked in descending order for each cellular tower identifier and cellular signal strength pair is shown and described above with respect to Table 3.

At block 410, the processor 110 may store an index of the ranked cumulated level counts according to identifications and cellular signal strengths of the cellular tower. The index may enable an availability of an access point of the plurality of access points to be predicted through a search for a cellular tower identification and cellular signal strength in the index. For instance, the processor 110 may store the index in a manner as shown in Table 3 above such that a cellular tower identification and cellular signal strength pair may be correlated with a ranked list of available access points. In one regard, therefore, the processor 110 may identify the highest ranked access point corresponding to a cellular tower identification and cellular signal strength pair by performing a query on the index for the cellular tower identification and cellular signal strength pair. In other words, for a given cellular tower identification and cellular signal strength pair, the processor 110 may identify the corresponding access point predicted to be available by simply performing a keyword search into the index.

At block 412, the processor 110 may access a query fingerprint. The query fingerprint may include a query cellular tower identifier and a query cellular signal strength. That is, the query fingerprint may include the cellular tower identifier to which the mobile device 150 is currently in communication and the cellular signal strength of the communication between the cellular tower identifier and the mobile device 150. In an example in which the computing device 100 is separate from the mobile device 150, the mobile device 150 may generate the query fingerprint and the processor 110 may access the query fingerprint through receipt of the query fingerprint from the mobile device 150. In an example in which the computing device 100 is the mobile device 150, the processor 110 may access the query fingerprint by generating the query fingerprint.

At block 414, the processor 110 may query the index using the query fingerprint. That is, the processor 110 may search the index for a cellular tower identifier and cellular signal strength pair that matches the query cellular tower identifier and query cellular signal strength specified in the query fingerprint. The processor 110 may thus perform a search into the index with the query cellular tower identifier and query cellular signal strength specified in the query fingerprint as keywords to the search.

At block 416, the processor 110 may identify an access point having the highest ranking corresponding to the matching cellular tower identifier and cellular signal strength pair in the index. For instance, as shown in Table 3 above, the index may specify the ranked order of access points for each identified cellular tower identifier and cellular signal strength pair. In this regard, the processor 110 may identify the access point having the highest ranking corresponding to the matching cellular tower identifier and cellular signal strength pair from the index. In another example, the processor 110 may identify each of the access points and their rankings.

At block 418, in an example in which the computing device 100 is separate from the mobile device 150, the processor 110 may output the identified access point to the mobile device 150. In this example, the mobile device 150 may attempt to connect to the identified access point. In an example in which the computing device 100 is the mobile device 150, at block 418, the processor 110 may attempt to connect to the identified access point. Additionally, if the mobile device 150 is unable to connect to the identified access point, the mobile device 150 may attempt to connect to the next identified access point in the ranked order of access points, and so forth.

Although reference is made in both FIGS. 3 and 4 to the training fingerprints containing a single cellular tower identification, it should be clearly understood that the training fingerprints may specify a plurality of cellular tower identifications. In this regard, the index may identify the plurality of cellular tower identifications and cellular signal strengths corresponding to the plurality of cellular tower identifications.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A computing device comprising:
   a processor; and
   a memory on which is stored machine readable instructions that are to cause the processor to:
      receive, from a mobile device, a set of training fingerprints, including data specifying cellular signal strength, wherein each of the training fingerprints specifies an access point of a plurality of access points to which the mobile device made a successful connection, a relative signal strength of the connection to the access point, a cellular tower identifier of a cellular tower near the mobile device when the successful connection to the access point was made and a cellular signal strength of a signal from the cellular tower near the mobile device when the successful connection to the access point was made;
      generate, from the set of training fingerprints, a plurality of cumulated level counts of the relative signal strengths of the connections to the access points corresponding to the cellular signal strengths of the cellular tower;
      rank the plurality of cumulated level counts of the relative signal strengths of the access points to generate a ranked list of access points;
      generate an index of the ranked list of access points comprising associated pairs of the cellular tower identifier and the cellular signal strength and the ranked list of access points;
      initiate a keyword query of the index of the ranked list of access points to identify an access point having a highest ranking; and
      transmit, to the mobile device, an instruction to activate a Wi-Fi radio of the mobile device and to attempt to connect the Wi-Fi radio to the identified access point.

2. The computing device according to claim 1, wherein, to cumulate the level counts of the access points, the machine readable instructions are further to cause the processor to:
   determine, from the set of training fingerprints, level counts of relative signal strengths of the connections between the mobile device and the access points occurring after handoffs of the mobile device to the access points from the cellular tower.

3. The computing device according to claim 2, wherein, to rank the cumulated level counts of the signal strengths of the access points, the machine readable instructions are further to cause the processor to:
for each cellular signal strength of the cellular tower, rank, from the cumulated level counts, the access points in a descending order with the access point having the largest level count for a cellular signal strength having the highest ranking.

4. The computing device according to claim 3, wherein the machine readable instructions are further to cause the processor to:
store an index of a correlation between the rankings of the access points for each of a plurality of cellular tower identifier and cellular signal strength pairs.

5. The computing device according to claim 4, wherein the machine readable instructions are further to cause the processor to:
access a query fingerprint having a query cellular tower identification and a query cellular signal strength; and
identify a cellular tower identifier and cellular signal strength in the stored index matching the query cellular tower identification and the query cellular signal strength
wherein the matching cellular tower identifier and cellular signal strength in the index are utilized to identify the access point having the highest ranking.

6. The computing device according to claim 1, wherein, to cumulate the level counts of the access points, the machine readable instructions are further to cause the processor to:
normalize, from the set of training fingerprints, the relative signal strengths of the access points; and
cumulate the normalized relative signal strengths of the connections to the access points to cumulate the level counts of the relative signal strengths of the access points.

7. The computing device according to claim 1, wherein, to cumulate the level counts of the relative signal strengths of the access points, the machine readable instructions are further to cause the processor to:
merge the training fingerprints based on the cellular tower and multiple cellular signal strengths corresponding to connections between the mobile device and the cellular tower prior to the mobile device making the successful connections to the access points.

8. The computing device according to claim 1, wherein the set of training fingerprints species cellular signal strengths of a plurality cellular tower to which the mobile device was connected prior to making respective successful connections to access points, and wherein the machine readable instructions are further to cause the processor to:
cumulate, from the set of training fingerprints, level counts of the relative signal strengths of the access points corresponding to the respective connections between the mobile device and the access points following handoff of the mobile device from the plurality of cellular towers to the access points.

9. The computing device according to claim 1, wherein the computing device is the mobile device.

10. A method for predicting access point availability, said method comprising:
receiving, from a mobile device, a set of training fingerprints, including data specifying cellular signal strength, wherein each of the training fingerprints specifies an access point of a plurality of access points to which the mobile device made a successful connection, a relative signal strength of the connection to the access point, a cellular tower identifier of a cellular tower near the mobile device when the successful connection to the access point was made and a cellular signal strength of a signal from the cellular tower near the mobile device when the successful connection to the access point was made;
generating, by the processor, from the set of training fingerprints, a plurality of cumulated level counts of the relative signal strengths of the connections to the access points corresponding to the cellular signal strengths of the cellular tower near the mobile device when the connections to the access points were made;
ranking, by the processor, the plurality of the cumulated level counts of the relative signal strengths of the access points according to a predetermined ranking scheme to generate a ranked list of access points;
generating an index of the ranked list of access points comprising associated pairs of the cellular tower identifier and the cellular signal strength and the ranked list of access points;
storing, by the processor, the index of the ranked list of access points in a computer-readable memory;
initiating a keyword query of the index of the ranked list of access points to identify an access point having a highest ranking; and
transmitting, to the mobile device, an instruction to activate a Wi-Fi radio of the mobile device and to attempt to connect the Wi-Fi radio to the identified access point.

11. The method according to claim 10, further comprising:
normalizing the relative signal strengths of the connections to the access points; and
wherein cumulating the level counts further comprises cumulating the level counts of the normalized relative signal strengths of the connections to the access points.

12. The method according to claim 10, wherein cumulating the level counts further comprises merging the training fingerprints based on the cellular tower and multiple cellular signal strengths corresponding to connections between the mobile device and the cellular tower prior to the mobile device being handed off to the access points.

13. The method according to claim 10, further comprising:
accessing a query fingerprint having a query cellular tower identifier and a query cellular signal strength;
querying the index of the ranked cumulated level counts for a cellular tower identification and cellular signal strength pair that matches the query cellular tower identifier and query cellular signal strength; and
identifying an access point having the highest ranking corresponding to the matching cellular tower identification and cellular signal strength pair, wherein the identified access point is predicted to be an available access point to the mobile device.

14. A non-transitory computer readable storage medium on which is stored machine readable instructions that when executed by a processor cause the processor to:
receive, from a mobile device, a set of training fingerprints, including data specifying cellular signal strength, wherein each of the training fingerprints specifies an access point of a plurality of access points to which the mobile device made a successful connection, a relative signal strength of the successful connection to the access point, a cellular tower identifier of a cellular tower near the mobile device when the successful connection to the access point was made and a received signal strength indicator (RSSI) of a signal from the cellular tower near the mobile device when the successful connection to the access point was made;

generate, from the set of training fingerprints, a plurality of cumulated level counts of the relative signal strengths of the connections to the access points corresponding to the RSSI's of the cellular tower;

sort the plurality of the cumulated level counts of the relative signal strengths of the access points according to a predetermined ranking scheme to generate a ranked list of access points;

generate an index of the ranked list of access points comprising associated pairs of the cellular tower identifier and the cellular signal strength and the ranked list of access points;

store the index of the ranked list of access points in a computer-readable memory;

initiate a keyword query of the index of the ranked list of access points to identify an access point having a highest ranking; and transmit, to the mobile device, an instruction to activate a Wi-Fi radio of the mobile device and to attempt to connect the Wi-Fi radio to the identified access point through a non-cellular network.

15. The non-transitory computer readable storage medium according to claim 14, wherein the machine readable instructions are further to cause the processor to:

access a query fingerprint having a query cellular tower identifier and a query RSSI;

query the index of the sorted cumulated level counts for a cellular tower identification and a RSSI that matches the query cellular tower identifier and query RSSI pair; and identify an access point having the highest ranking corresponding to the matching cellular tower identifier and RSSI pair, wherein the identified access point is predicted to be an available access point to the mobile device.

16. The computing device according to claim 1, wherein the processor identifies the access point having a highest ranking, while a global positioning system and a radio wireless local area networking adapter of the mobile device are turned off to preserve the mobile device's battery and increase a likelihood of performing a successful handoff.

\* \* \* \* \*